A. L. HOWIE.
FILTERING DRINKING CUP.
APPLICATION FILED SEPT. 17, 1913.
1,091,845.
Patented Mar. 31, 1914.
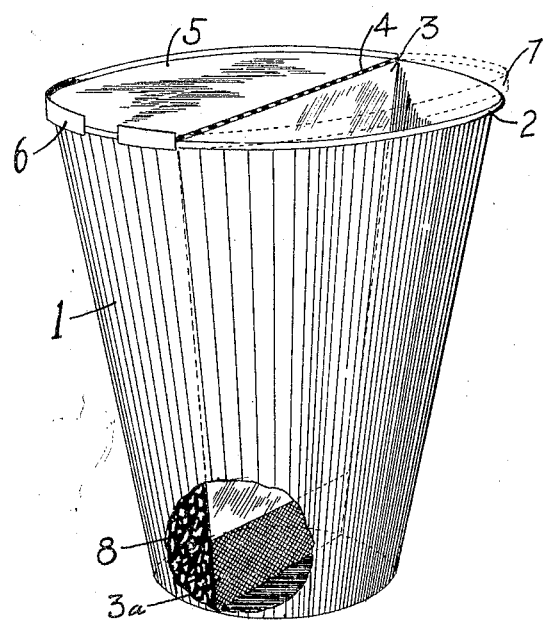
WITNESSES:
John A. Ravensmith
J. B. Cambers
INVENTOR
Amy L. Howie
BY F. C. Bates
HER ATTORNEY

UNITED STATES PATENT OFFICE.

AMY L. HOWIE, OF SAN JOSE, CALIFORNIA.

FILTERING DRINKING-CUP.

1,091,845.

Specification of Letters Patent. Patented Mar. 31, 1914.

Application filed September 17, 1913. Serial No. 790,230.

*To all whom it may concern:*

Be it known that I, AMY L. HOWIE, a citizen of the United States, residing at San Jose, in the county of Santa Clara and State of California, have invented a new and useful Improvement in Filtering Drinking-Cups, of which the following is a specification.

My invention relates to improvements in filtering drinking-cups; and the objects of my invention are, first, to provide a drinking-cup that will filter the water used during the process of filling, thus removing the impurities in said water; second, to provide a drinking-cup of two compartments so constructed that no unfiltered water will enter the one compartment while being admitted to the other compartment; third, to provide a portable filtering drinking-cup that may be easily carried in a suit case or grip by travelers and campers; fourth to provide a filtering drinking-cup that is simple in construction, durable, and easily cleaned. I attain these objects by means of the device illustrated in the accompanying drawing, in which the figure is a perspective view of my filtering drinking-cup, parts being broken away.

In the drawing here presented, 1 is a drinking-cup made of metal or any other suitable material and having a rolled upper edge as shown at 2. Vertically disposed in approximately the center of said drinking-cup is fastened a partition as shown at 3, having its two side edges and its bottom edge securely fastened to the walls and bottom respectively of said drinking-cup, the lower end of said partition being foraminous from the bottom up a distance, as shown at 3¹, for the purpose of allowing the liquid to flow into the other portion of said cup after the same has passed through the filtering material. The upper edge of said partition is rolled over a wire or otherwise manipulated to form a hinging edge as shown at 4, for a cover 5. Said cover 5 is designed to cover but one side of the cup at a time, and has a double flange worked on its outer edge as shown at 6. This double flange 6 is so constructed as to form a spring clasp over said rolled edge 2 when cover 5 is shut down upon it in either direction. 7 shows said cover 5 reversed and about to be closed down upon one side of said cup 1 while water is being admitted to the other side which contains a filtering substance 8. Said filtering substance 8 may be any filtering material that will purify the water when passing therethrough. Said cover 5 is made reversible for the purpose of preventing any unfiltered water from entering the one side of said cup 1 during the process of filling. While a metallic cup, cover and partition are here shown and described, I do not wish to confine myself to any specific material, as approximately the same result may be accomplished if said cup be made of paper or any other suitable material with a partition of like material placed therein having the lower end thereof foraminous as shown in the drawing.

Having thus described my invention, what I claim as new and desire to secure by Letters Patent, is—

1. In a filtering drinking-cup, the combination of a cup having a rolled upper edge, a partition vertically disposed in approximately the center thereof having its lower end foraminous up a distance, a cover hinged to the upper edge of said partition, and a filtering material placed in one of the compartments of said cup, as shown and described.

2. In a filtering drinking-cup, the combination of a cup having a rolled upper edge, a partition vertically disposed in approximately the center of said cup having its lower end foraminous up a distance, a cover hinged to the upper edge of said partition and adapted to close down over either compartment formed by said partition in said cup, said cover having a double flange worked on its outer edge adapted to hold said cover in position when closed over either compartment, and a filtering material placed in one of said compartments, substantially as shown and described.

In testimony whereof I have signed my name to this specification in the presence of two subscribing witnesses.

AMY L. HOWIE.

Witnesses:
JOHN A. NAISMITH,
LEICESTER DARWALL.